(12) United States Patent
Ma et al.

(10) Patent No.: US 12,696,271 B2
(45) Date of Patent: Jul. 28, 2026

(54) SCHEDULING REQUEST RESOURCE CONFIGURATION

(71) Applicant: ZTE CORPORATION, Shenzhen (CN)

(72) Inventors: Xiaoying Ma, Shenzhen (CN); Yuzhou Hu, Shenzhen (CN); Jun Xu, Shenzhen (CN); Mengzhu Chen, Shenzhen (CN); Jiajun Xu, Shenzhen (CN); Hong Tang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 306 days.

(21) Appl. No.: 18/511,117

(22) Filed: Nov. 16, 2023

(65) Prior Publication Data

US 2024/0089959 A1     Mar. 14, 2024

Related U.S. Application Data

(63) Continuation of application No. PCT/CN2021/122085, filed on Sep. 30, 2021.

(51) Int. Cl.
| | |
|---|---|
| *H04W 72/1268* | (2023.01) |
| *H04B 7/06* | (2006.01) |
| *H04L 5/14* | (2006.01) |
| *H04W 72/232* | (2023.01) |

(52) U.S. Cl.
CPC ...... *H04W 72/1268* (2013.01); *H04B 7/0626* (2013.01); *H04L 5/1469* (2013.01); *H04W 72/232* (2023.01)

(58) Field of Classification Search
None
See application file for complete search history.

(56) References Cited

U.S. PATENT DOCUMENTS

| | | | |
|---|---|---|---|
| 2013/0163536 A1 | 6/2013 | Anderson et al. | |
| 2013/0163537 A1 | 6/2013 | Anderson et al. | |
| 2013/0250828 A1* | 9/2013 | Chou | H04W 72/23 |
| | | | 370/329 |
| 2015/0003391 A1* | 1/2015 | Chen | H04L 5/0044 |
| | | | 370/329 |
| 2018/0279324 A1 | 9/2018 | Wang et al. | |
| 2018/0368156 A1* | 12/2018 | Agiwal | H04W 72/20 |
| 2019/0166623 A1* | 5/2019 | Wei | H04W 72/12 |
| 2021/0076453 A1* | 3/2021 | Luo | H04W 76/36 |
| 2021/0144582 A1* | 5/2021 | Yi | H04W 28/0278 |

(Continued)

FOREIGN PATENT DOCUMENTS

| | | |
|---|---|---|
| CN | 109392117 | 2/2019 |
| WO | WO 2018/175547 | 9/2018 |

OTHER PUBLICATIONS

International Search Report issued Apr. 25, 2022 in International (PCT) Application No. PCT/CN2021/122085.

*Primary Examiner* — Clemence S Han
(74) *Attorney, Agent, or Firm* — Crowell & Moring LLP

(57) ABSTRACT

In wireless communication, an improved change of a schedule request ("SR") resource configuration is provided. The SR resource configuration may be transmitted from a basestation to user equipment ("UE") and may include a parameter for the configuring of one or more SRs. A validity of the SR resource configuration is determined based on predefined information or high layer signaling.

19 Claims, 6 Drawing Sheets

(56) References Cited

U.S. PATENT DOCUMENTS

| | | | |
|---|---|---|---|
| 2021/0243784 A1* | 8/2021 | Goto ..................... | H04W 72/21 |
| 2021/0298052 A1* | 9/2021 | Namba ................. | H04L 1/1851 |
| 2021/0321425 A1* | 10/2021 | Ohta ..................... | H04W 72/21 |
| 2022/0095355 A1* | 3/2022 | Kim ...................... | H04W 72/21 |
| 2022/0141848 A1* | 5/2022 | Wong ................. | H04W 72/566 |
| | | | 370/329 |
| 2022/0201765 A1* | 6/2022 | Huang ................. | H04B 17/318 |
| 2022/0368406 A1* | 11/2022 | Kang .................... | H04W 72/21 |
| 2023/0389012 A1* | 11/2023 | Mukkera .............. | H04W 72/21 |
| 2024/0072973 A1* | 2/2024 | Niu ....................... | H04L 5/0053 |

* cited by examiner

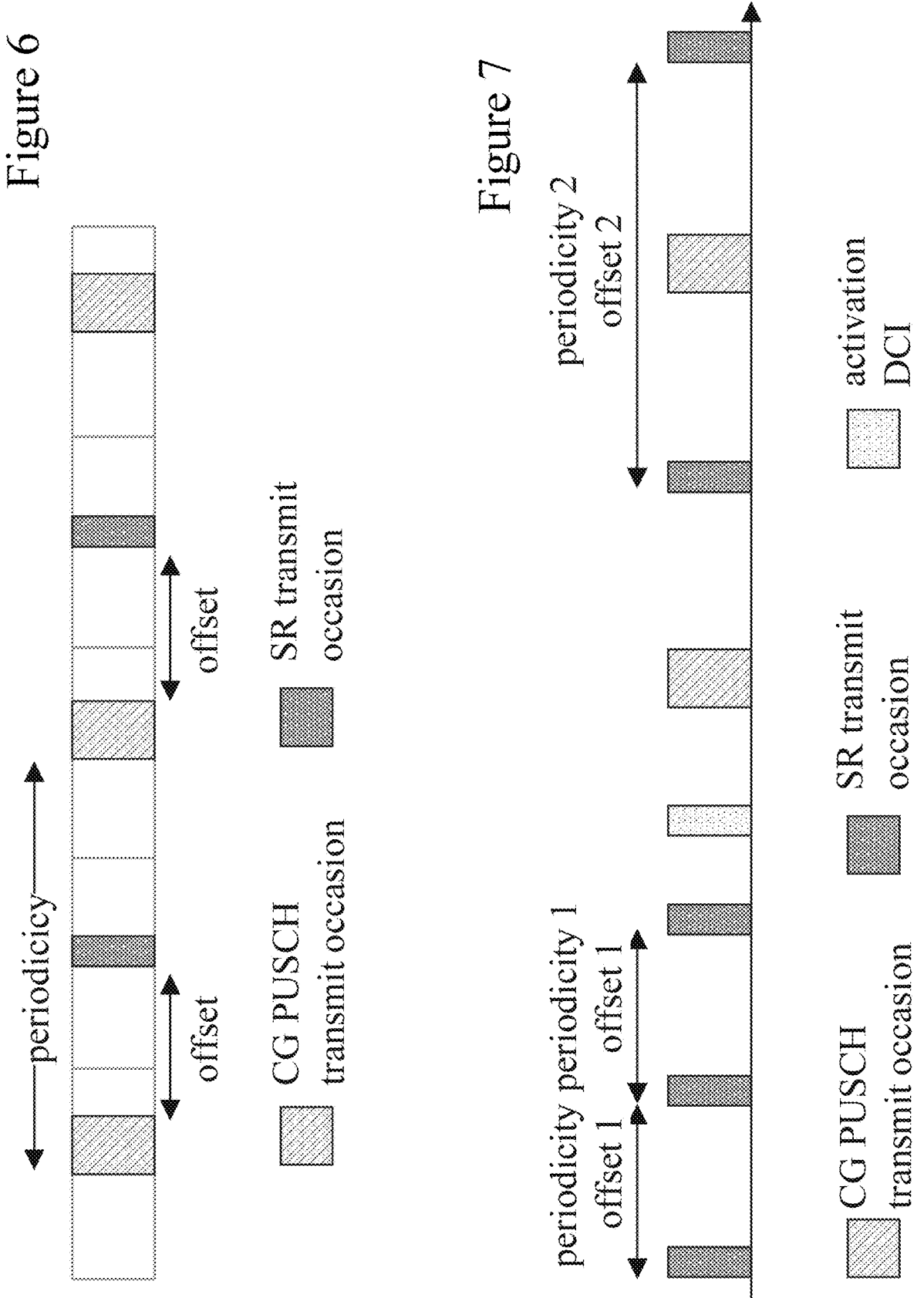

SCHEDULING REQUEST RESOURCE CONFIGURATION

This application is a continuation application of PCT International Application No. PCT/CN2021/122085, filed with the China National Intellectual Property Administration, PRC on Sep. 30, 2021, which is herein incorporated by reference in its entirety.

TECHNICAL FIELD

This document is directed generally to wireless communications. More specifically, resource configuration for scheduling requests are improved.

BACKGROUND

Wireless communication technologies are moving the world toward an increasingly connected and networked society. Wireless communications rely on efficient network resource management and allocation between user mobile stations and wireless access network nodes (including but not limited to wireless base stations). A new generation network is expected to provide high speed, low latency and ultra-reliable communication capabilities and fulfil the requirements from different industries and users. User mobile stations or user equipment (UE) are becoming more complex and the amount of data communicated continually increases. The transmission rate, delay, throughput, reliability and other performance indexes of wireless communication system have been improved by using high frequency band, large bandwidth, multi-antenna and other technologies. eXtended Reality (XR) and Cloud Gaming are media applications requiring improved performance. XR includes representative forms such as Augmented Reality (AR), Mixed Reality (MR) and Virtual Reality (VR). These services need high reliability, high throughput, and low latency, while at the same time improving battery life for an improved UE experience. The battery life will also have impact on UE experience. In order to improve communications, increase the reliability while reducing UE power consumption and meet reliability requirements for the vertical industry as well as support the new generation network service, communication improvements should be made.

SUMMARY

This document relates to methods, systems, and devices for resource configuration for scheduling requests. In wireless communication, an improved change of a schedule request ("SR") resource configuration is provided. The SR resource configuration may be transmitted from a basestation to user equipment ("UE") and may include a parameter for the configuring of one or more SRs. A validity of the SR resource configuration is determined based on predefined information or high layer signaling.

In one embodiment, a method performed by user equipment ("UE") in a wireless network includes receiving from a basestation in the wireless network, a signal including a scheduling request ("SR") resource configuration, and determining a validity of the SR resource configuration based on predefined information. The method includes that the scheduling request resource configuration may be transmitted via a radio resource control ("RRC") signaling. The method includes transmitting one or more SRs based on the validity determination of the SR resource configuration. A number of the transmitted SRs during a first type of duration does not exceed a threshold value. The predefined information for the validity determination further includes a high layer signaling or a change pattern. The SR resource configuration is associated with at least one of a discontinuous reception ("DRX") parameter, a traffic parameter, a time division duplex ("TDD") pattern, a configured grant ("CG") configuration, a physical downlink control channel ("PDCCH") skipping duration, a search space set configuration, a UE capability, UE assistance information, SR group identification, a change pattern, SR-ProhibitTimer, or SR-TransMax. The SR resource configuration is associated with one or more SR group identification ("ID") for SR group switching and the SR group ID indicates which SR group the SR resource configuration belongs to, further wherein multiple SR resource configurations are associated with a SR group ID or a SR group ID is associated with no SR resource configurations. The SR resource configuration is associated with one or more set of parameters that comprise at least one of a periodicity or an offset. The SR resource configuration is associated with a change pattern, wherein the change pattern includes a timer and an adjustment value, wherein a parameter in the SR resource configuration is changed according to the adjustment value if the timer expire and the timer will be re-triggered when the parameter in the SR resource configuration is changed.

In some embodiments, the method includes predefined information including at least one of a layer one ("L1") signaling, a UE assistance information, a UE capability, a physical uplink control channel ("PUCCH") format, a timer, a discontinuous reception ("DRX") parameter, a DRX active time, a DRX duration timer, a DRX inactivity timer, a physical downlink control channel ("PDCCH") monitoring behavior, a predetermined value, a predetermined condition, a predetermined pattern, a traffic parameter, a schedule request ("SR"), a buffer status report ("BSR"), or a UL transmit pattern. The predefined information comprises a UL transmit pattern which includes an UL transmit window, wherein a first SR group is used during the UL transmit window and a second SR group is used outside the UL transmit window. The predefined information comprises downlink control information ("DCI"). The DCI indicates at least one of a SR group identification ("ID"), a trigger flag, a parameter set change indication, a SR configuration parameter change indication, a SR-ProhibitTimer change indication, a SR-TransMax change indication, an adjustment value, or an adjustment value index. The indication is in a field and an existence of the field is associated with at least one of a downlink control information ("DCI"), a Radio Network Temporary Identifier ("RNTI"), a high layer signaling, a UE capability, a frequency range ("FR") type, or a sub-carrier space ("SCS"). The DCI comprises a group common DCI, which includes information about one or more UEs. Radio resource control ("RRC") signaling indicates at least one of a location of indication information carried by the DCI for the UE, a start point of the indication information, or a bitmap, wherein each bit in the bitmap indicates the indication information for a serving cell group. The indication is associated with at least one of a physical downlink control channel ("PDCCH") skipping indication, a search space set group switching indication, a configured grant ("CG") activation indication, a CG deactivation indication, a semi-persistent scheduling ("SPS") activation indication, a SPS deactivation indication, a secondary cell ("SCell") dormancy indication, or a cross slot scheduling indication.

In some embodiments, the method includes the SR resource is valid after an application delay. The application delay is associated with at least one of a sub-carrier space ("SCS"), a physical uplink shared channel ("PUSCH") preparation procedure time, a minimum scheduling offset, a physical downlink shared channel ("PDSCH") decoding procedure time, a UE capability, or a predetermined value. The determining the validity is in response to an enable condition, wherein the enable condition is associated with at least one of a radio resource control ("RRC") signaling, a medium access control control element ("MAC CE") signaling, a layer one ("L1") signaling, a discontinuous reception ("DRX") active time, physical downlink control channel ("PDCCH") monitoring behavior, a UE capability, or DRX configuration. The method further includes receiving a high layer signaling including a second enable information which is used to control SR triggering when a configured uplink grant of type1 or type2 is configured, wherein the second enable information is configured per UE or per bandwidth part ("BWP").

In one embodiment, a method performed by a basestation in a wireless network includes transmitting, to a user equipment ("UE"), a signal including a scheduling request ("SR") resource configuration, and determining a validity of the SR resource configuration based on predefined information. The method includes receiving one or more SRs based on the validity determination of the SR resource configuration. A number of the received SRs during a first type of duration does not exceed a threshold value. The predefined information for the validity determination further includes a high layer signaling or a change pattern. The SR resource configuration is associated with at least one of a discontinuous reception ("DRX") parameter, a traffic parameter, a time division duplex ("TDD") pattern, a configured grant ("CG") configuration, a physical downlink control channel ("PDCCH") skipping duration, a search space set configuration, a UE capability, UE assistance information, SR group identification, a change pattern, SR-ProhibitTimer, or SR-TransMax. The SR resource configuration is associated with one or more SR group identification ("ID") for SR group switching and the SR group ID indicates which SR group the SR resource configuration belongs to, further wherein multiple SR resource configurations are associated with a SR group ID or a SR group ID is associated with no SR resource configurations. The SR resource configuration is associated with one or more set of parameters that comprise at least one of a periodicity or an offset. The SR resource configuration is associated with a change pattern, wherein the change pattern includes a timer and an adjustment value, wherein a parameter in the SR resource configuration is changed according to the adjustment value if the timer expire and the timer will be re-triggered when the parameter in the SR resource configuration is changed.

In some embodiments, the method includes predefined information including at least one of a layer one ("L1") signaling, a UE assistance information, a UE capability, a physical uplink control channel ("PUCCH") format, a timer, a discontinuous reception ("DRX") parameter, a DRX active time, a DRX duration timer, a DRX inactivity timer, a physical downlink control channel ("PDCCH") monitoring behavior, a predetermined value, a predetermined condition, a predetermined pattern, a traffic parameter, a schedule request ("SR"), a buffer status report ("BSR"), or a UL transmit pattern. The predefined information comprises a UL transmit pattern which includes an UL transmit window, wherein a first SR group is used during the UL transmit window and a second SR group is used outside the UL transmit window. The predefined information comprises downlink control information ("DCI"). The DCI indicates at least one of a SR group identification ("ID"), a trigger flag, a parameter set change indication, a SR configuration parameter change indication, a SR-ProhibitTimer change indication, a SR-TransMax change indication, an adjustment value, or an adjustment value index. The indication is in a field and an existence of the field is associated with at least one of a downlink control information ("DCI"), a Radio Network Temporary Identifier ("RNTI"), a high layer signaling, a UE capability, a frequency range ("FR") type, or a sub-carrier space ("SCS"). The DCI comprises a group common DCI, which includes information about one or more UEs. Radio resource control ("RRC") signaling indicates at least one of a location of indication information carried by the DCI for the UE, a start point of the indication information, or a bitmap, wherein each bit in the bitmap indicates the indication information for a serving cell group. The indication is associated with at least one of a physical downlink control channel ("PDCCH") skipping indication, a search space set group switching indication, a configured grant ("CG") activation indication, a CG deactivation indication, a semi-persistent scheduling ("SPS") activation indication, a SPS deactivation indication, a secondary cell ("SCell") dormancy indication, or a cross slot scheduling indication.

In some embodiments, the method includes the SR resource is valid after an application delay. The application delay is associated with at least one of a sub-carrier space ("SCS"), a physical uplink shared channel ("PUSCH") preparation procedure time, a minimum scheduling offset, a physical downlink shared channel ("PDSCH") decoding procedure time, a UE capability, or a predetermined value. The determining the validity is in response to an enable condition, wherein the enable condition is associated with at least one of a radio resource control ("RRC") signaling, a medium access control control element ("MAC CE") signaling, a layer one ("L1") signaling, a discontinuous reception ("DRX") active time, physical downlink control channel ("PDCCH") monitoring behavior, a UE capability, or DRX configuration. The method further includes transmitting a high layer signaling including a second enable information which is used to control SR triggering when a configured uplink grant of type1 or type2 is configured, wherein the second enable information is configured per UE or per bandwidth part ("BWP").

In one embodiment, a wireless communications apparatus comprises a processor and a memory, and the processor is configured to read code from the memory and implement any of the embodiments discussed above.

In one embodiment, a computer program product comprises a computer-readable program medium code stored thereupon, the code, when executed by a processor, causes the processor to implement any of the embodiments discussed above.

In some embodiments, there is a wireless communications apparatus comprising a processor and a memory, wherein the processor is configured to read code from the memory and implement any methods recited in any of the embodiments. In some embodiments, a computer program product comprising a computer-readable program medium code stored thereupon, the code, when executed by a processor, causing the processor to implement any method recited in any of the embodiments. The above and other aspects and their implementations are described in greater detail in the drawings, the descriptions, and the claims.

BRIEF DESCRIPTION OF THE DRAWINGS

FIG. 6 shows one example of configuration with a schedule request ("SR") transmit occasion.

FIG. 7 shows another example of configuration with a schedule request ("SR") transmit occasion.

DETAILED DESCRIPTION

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Figure 1:
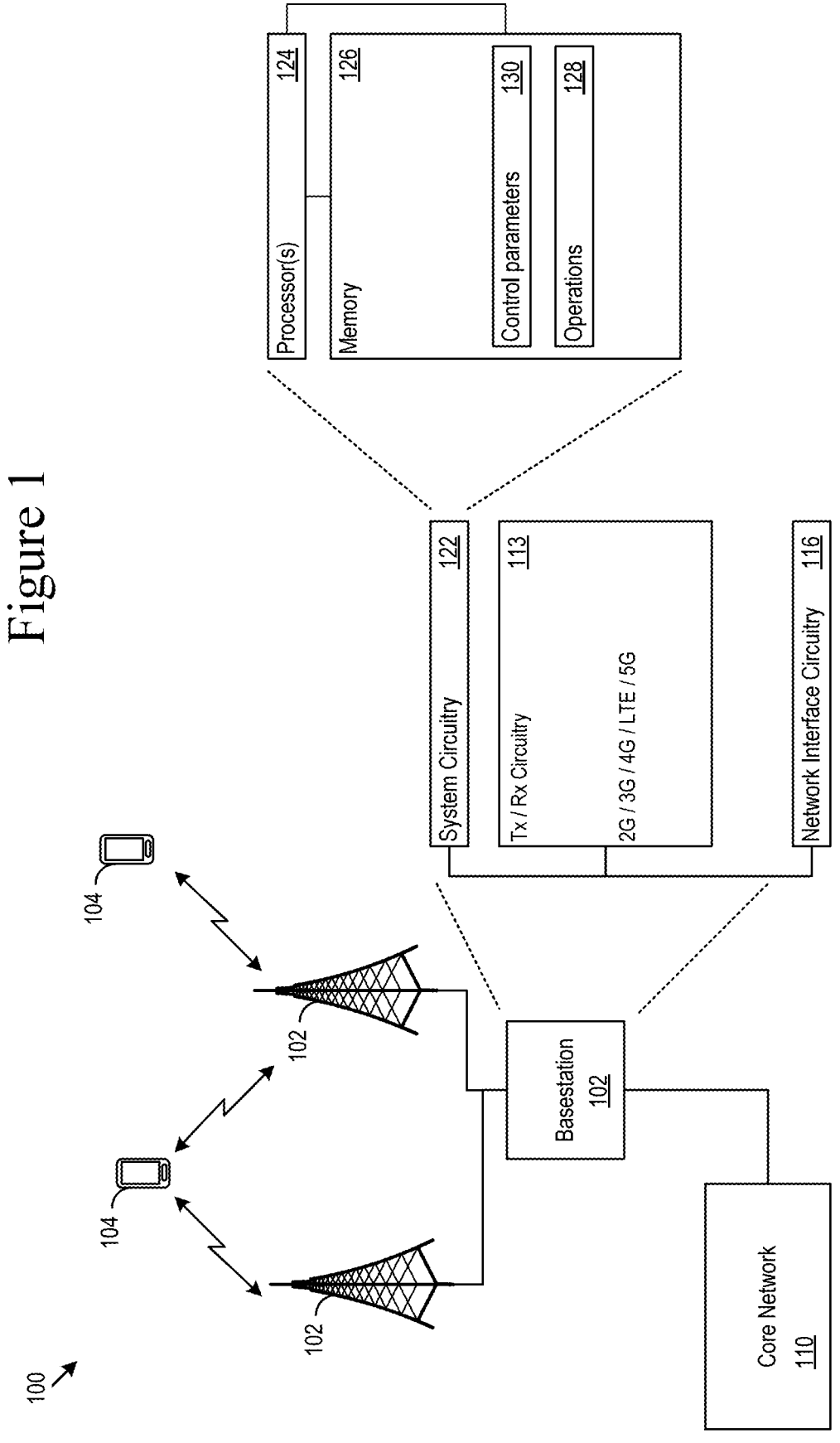
FIG. 1 shows an example basestation.
Figure 2:
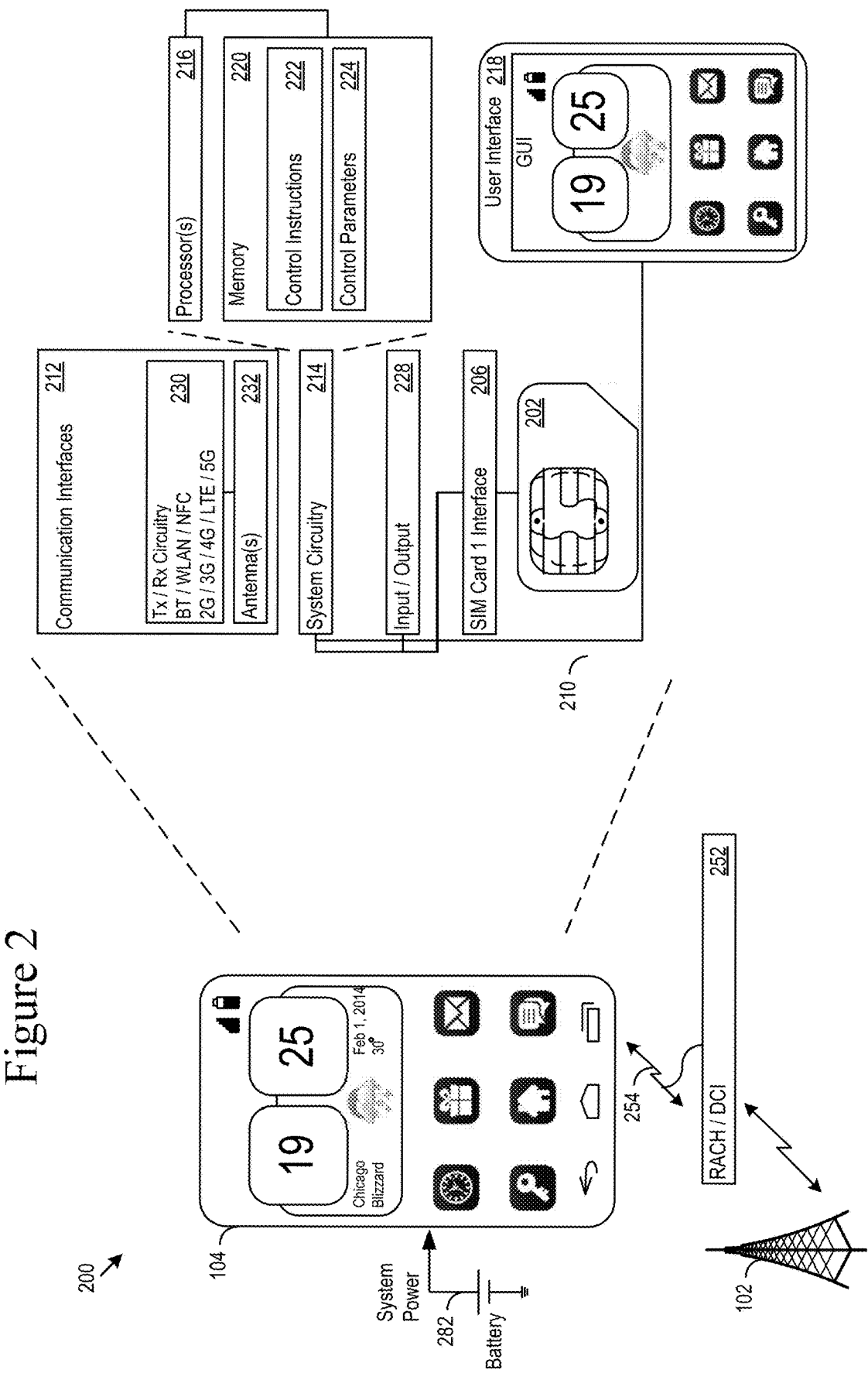
FIG. 2 shows an example random access ("RA") messaging environment.

Radio resource control ("RRC") is a protocol layer between UE and the basestation at the IP level (Network Layer). There may be various Radio Resource Control (RRC) states, such as RRC connected (RRC_CONNECTED), RRC inactive (RRC_INACTIVE), and RRC idle (RRC_IDLE) state. As described, UE can transmit data through a Random Access Channel ("RACH") protocol scheme or a Configured Grant ("CG") scheme or based on UL grant. CG may be used to reduce the waste of periodically allocated resources. The basestation or node may assign CG resources to eliminate packet transmission delay and to increase a utilization ratio of allocated periodic radio resources. The CG scheme is merely one example of a protocol scheme for communications and other examples, including but not limited to RACH, are possible. The wireless communications described herein may be through radio access including new radio ("NR") access. A CG configuration or CG scheme may include a periodicity. The offset of a Type 1 CG (e.g. offset related to the reference system frame number ("SFN")) may be configured by RRC signaling, while the offset of a Type 2 CG (e.g. offset related to a downlink control information ("DCI")) is indicated by a DCI. FIGS. 1-2 show example radio access network ("RAN") nodes (e.g. basestations) and user equipment and messaging environments.

If UE has UL data to be transmitted, the UE will transmit a Scheduling request ("SR") or a buffer status report ("BSR") to the basestation, and the basestation may send an uplink ("UL") grant to UE with an allocation of a physical uplink shared channel ("PUSCH") resource. The SR indication may indicate whether or not UE has UL data to be transmitted. In one embodiment, a '1' means there are some data to be transmitted. The SR may be transmitted using a physical uplink control channel ("PUCCH") if a UE does not have available PUSCH resource. The IE SchedulingRequestResourceConfig determines physical layer resources on PUCCH while the UE may send the dedicated scheduling request ("D-SR"). The SchedulingRequestResourceConfig IE includes schedulingRequestResourceId (i.e. ID of the SR resource), schedulingRequestID (i.e. ID of the associated SR), periodicityAndOffset (i.e. periodicity and offset of the SR resource which determine the transmit occasion). One SR configuration has a dedicated SR resource. The BSR can indicate the buffer size of the UL data. SR can be transmitted in a PUCCH, while BSR can be transmitted in a physical uplink shared channel ("PUSCH").

Configured grant ("CG") configuration includes a resource for PUSCH. If UE has UL data to be transmitted, the UE can send SR in SR transmission occasions to indicate there is UL data to be transmitted. UE can send a BSR if there have available uplink scheduling ("UL-SCH") resources to indicate the buffer size of the UL data. If the SR configuration is associated with a CG configuration, the transmission occasions for SR and BSR may be coordinated (e.g. the transmission occasion for SR and BSR may be interlaced), and the delay for UL data may be reduced.

Discontinuous reception ("DRX") is a power saving technique. The basic mechanism of DRX is to configure a DRX cycle for UE, and a drx-ondurationTimer to begin a DRX cycle. During the edrx-ondurationTimer, UE is in 'DRX On' state and continues monitoring PDCCH. If the UE successfully decodes a PDCCH, the UE stays awake (in 'DRX On' state) and starts an inactivity timer. The UE can go to sleep in 'DRX off' state after drx-ondurationTimer or drx-inactivityTimer expires. In 'DRX off', UE does not monitor PDCCH. The DRX maybe used in eXtended Reality ("XR") since the XR traffic is period transmitted. However, if DRX is off and UE transmits a SR, the UE will switch back to DRX On and monitor PDCCH. In some embodiments of XR service, uplink pose/control traffic will be generated every 4 ms, and the periodicity of video traffic is $\frac{1}{60}$ second, so UE may transmit SR frequently and may affect the DRX procedure (e.g., UE switch back to DRX ON). Hence, frequent UL transmission can decrease the time when UE in 'DRX off' and increase UE power consumption.

FIG. 1 shows an example basestation 102. The basestation may also be referred to as a wireless network node. The basestation 102 may be further identified to as a nodeB (NB, e.g., an eNB or gNB) in a mobile telecommunications context. The example basestation may include radio Tx/Rx circuitry 113 to receive and transmit signaling with user equipment (UEs) 104. The basestation may also include network interface circuitry 116 to couple the basestation to the core network 110, e.g., optical or wireline interconnects, Ethernet, and/or other data transmission mediums/protocols.

The basestation may also include system circuitry 122. System circuitry 122 may include processor(s) 124 and/or memory 126. Memory 126 may include operations 128 and control parameters 130. Operations 128 may include instructions for execution on one or more of the processors 124 to support the functioning the basestation. For example, the operations may handle random access transmission requests from multiple UEs. The control parameters 130 may include parameters or support execution of the operations 128. For example, control parameters may include network protocol settings, random access messaging format rules, bandwidth parameters, radio frequency mapping assignments, and/or other parameters.

FIG. 2 shows an example random access messaging environment 200. In the random access messaging environment a UE 104 may communicate with a basestation 102 over a random access channel 252. In this example, the UE 104 supports one or more Subscriber Identity Modules (SIMs), such as the SIM1 202. Electrical and physical interface 206 connects SIM1 202 to the rest of the user equipment hardware, for example, through the system bus 210.

The mobile device 200 includes communication interfaces 212, system logic 214, and a user interface 218. The system logic 214 may include any combination of hardware, software, firmware, or other logic. The system logic (system circuitry) 214 may be implemented, for example, with one or more systems on a chip (SoC), application specific integrated circuits (ASIC), discrete analog and digital circuits, and other circuitry. The system logic 214 is part of the implementation of any desired functionality in the UE 104. In that regard, the system logic 214 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, Internet connectivity; establishing, maintaining, and terminating wireless network connections, Bluetooth connections, or other connections; and displaying relevant information on the user interface 218. The user interface 218 and the inputs 228 may include a graphical user interface, touch sensitive display, haptic feedback or other haptic output, voice or facial recognition inputs, buttons, switches, speakers and other user interface elements. Additional examples of the inputs 228 include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

The system logic 214 may include one or more processors 216 and memories 220. The memory 220 stores, for example, control instructions 222 that the processor 216 executes to carry out desired functionality for the UE 104.

The control parameters 224 provide and specify configuration and operating options for the control instructions 222. The memory 220 may also store any BT, WiFi, 3G, 4G, 5G or other data 226 that the UE 104 will send, or has received, through the communication interfaces 212. In various implementations, the system power may be supplied by a power storage device, such as a battery 282

In the communication interfaces 212, Radio Frequency (RF) transmit (Tx) and receive (Rx) circuitry 230 handles transmission and reception of signals through one or more antennas 232. The communication interface 212 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium.

The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 212 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

The medium access control ("MAC") entity may be configured with zero, one, or more scheduling request ("SR") configurations (e.g. the IE SchedulingRequestConfig). An SR configuration may include of a set of physical uplink control channel ("PUCCH") resources for SR across different bandwidth parts ("BWPs") and cells. For a logical channel or for secondary cell ("SCell") beam failure recovery as well as consistent LBT failure recovery, one PUCCH resource for SR may be configured per BWP. In other words, one SR configuration is associated with one SR resource in some embodiments. One SR configuration is associated with a logical channel. In some embodiments, the maximum number of SR resources per BWP in a cell is 8. In some embodiments, high layer signaling may comprise RRC signaling or MAC CE signaling.

Figure 3A:
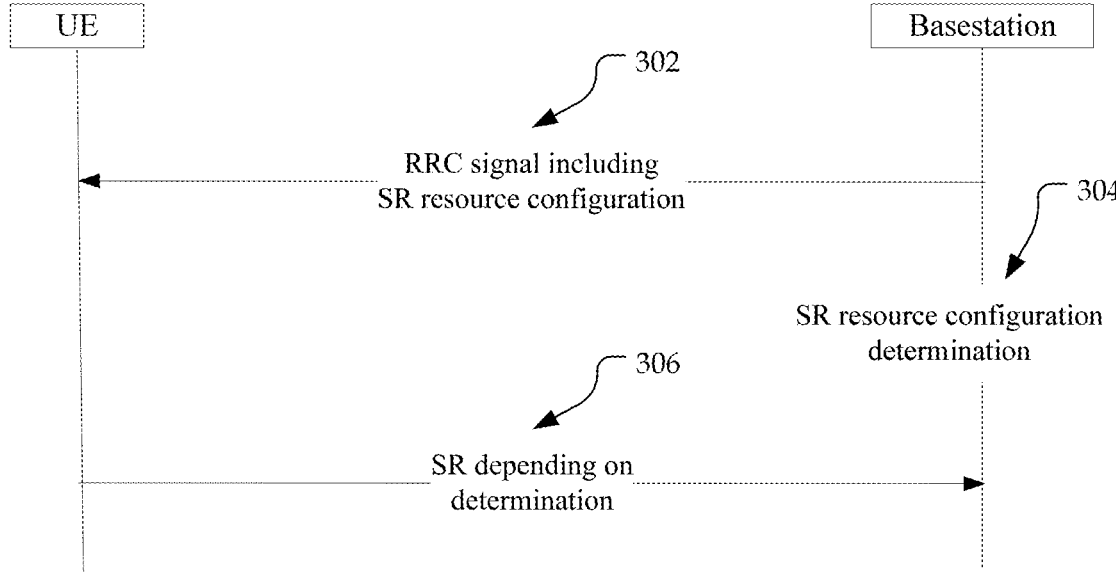
FIG. 3a shows one example of scheduling request ("SR") resource configuration communication.
Figure 3B:
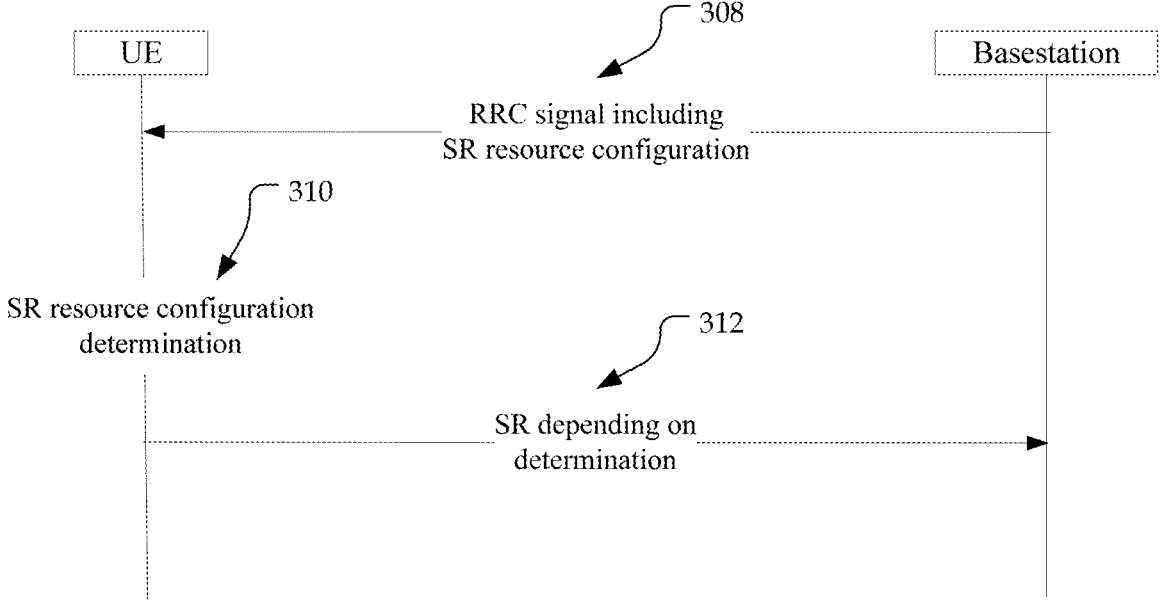
FIG. 3b shows another example of scheduling request ("SR") resource configuration communication.

The embodiments described below include an improved change of a schedule request ("SR") resource configuration. The SR resource configuration may be transmitted from a basestation to user equipment ("UE") and may include a parameter for the configuring of one or more SRs. A validity of the SR resource configuration is determined based on predefined information or high layer signaling. In some embodiments, the SR resource configuration may comprise a parameter in SchedulingRequestResourceConfig IE or a parameter in schedulingRequestConfig IE or other parameters as described below. In some embodiments, the SR resource configuration may also comprise parameters of configured grant ("CG") configuration, parameter of channel state information reference signal ("CSI-RS") resource configuration, parameter of CSI report configuration, parameter of sounding reference signal (SRS) resource. FIGS. 3a-3b show examples of the SR resource configuration communication and FIG. 4 shows an example of SR resource configuration and determination.

FIG. 3a shows one example of scheduling request ("SR") resource configuration communication. The basestation transmits a signal 302 to the UE that includes SR resource configuration. The SR resource configuration may be referred to as a resource configuration, resource parameter, SR configuration, SR parameter, or resource configuration parameter. The signal 302 may be a radio resource control ("RRC") message in one embodiment. The SR resource configuration is determined at 304 and the SR 306 is sent from the UE to the basestation depending on the determination. The determination may be with regard to whether the SR resource configuration is valid and may be based on high layer signaling or predefined information. The SR resource configuration communication as well as the SR resource configuration determination are further described below.

FIG. 3b shows another example of scheduling request ("SR") resource configuration communication. The basestation transmits a signal 308 to the UE that includes SR resource configuration. The SR resource configuration may be referred to as a resource configuration, resource parameter, SR configuration, SR parameter, or resource configuration parameter. The signal 308 may be a radio resource control ("RRC") message in one embodiment. The SR resource configuration is determined at 310 and the SR 312 is sent from the UE to the basestation depending on the determination. The determination may be with regard to whether a SR resource configuration is valid and may be based on high layer signaling or predefined information. The SR resource configuration communication as well as the SR resource configuration determination are further described below.

Figure 4:
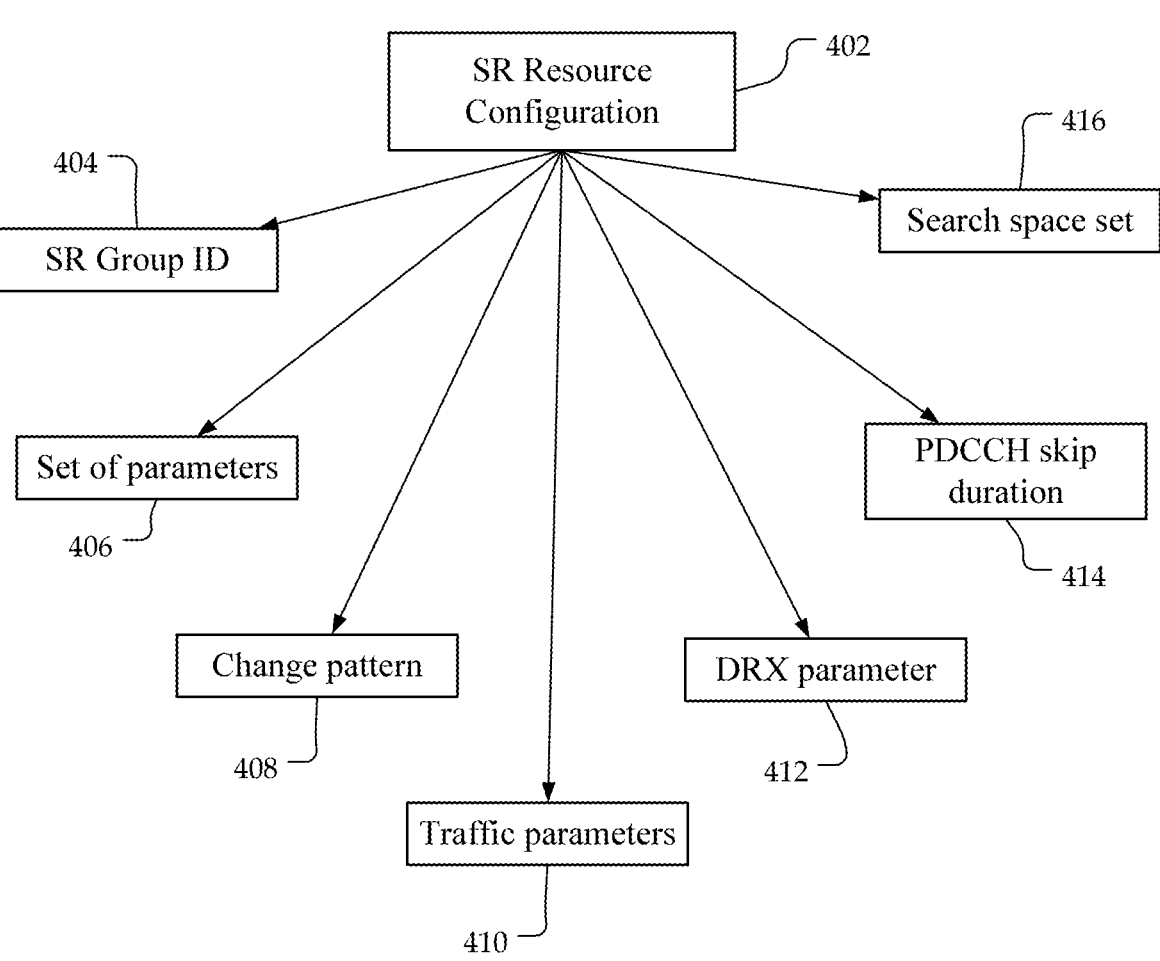
FIG. 4 shows examples of SR resource configuration and determination.

FIG. 4 shows examples of SR resource configuration and determination. The SR resource configuration determination 402 includes or is associated with a number of different parameters or elements. FIG. 4 illustrates some examples, but other examples are considered and discussed. For example, SR resource configuration 402 can further include or associate with a time division duplex ("TDD") pattern, a configured grant ("CG") configuration, a user equipment ("UE") capability, or UE assistance information.

The SR group identifications ("IDs") 404 are one example of an SR resource configuration or determination. The SR group ID 404 is used for SR group switching. Specifically, the SR group ID 404 indicates which SR group the SR resource configuration is associated with. For example, a SR resource configuration may be associated with SR group ID 2, and another SR resource configuration may be associated with SR group ID 1 and 2. In another example, one SR resource configuration may be associated with at most M (e.g., 2) SR resources. In some embodiments, at most M SR resources are associated with different SR group IDs. The SR group ID may be associated with no SR resource configuration. In some embodiments, this results in no SR will be transmitted if this SR group is utilized.

The set of parameters 406 are another example of an SR resource configuration or determination. In some embodiments, the SR resource configuration is associated with one or more set of parameters. The validity determination may be based on at least one of a high layer signaling or predefined information. There may be a dynamic switch between one or more parameters. For example, in SR resource configuration, parameters such as periodicityAndOffset and resource may be included. In this example, one SR resource configuration may have one or more set of parameters (e.g., two periodicityAndOffset configurations).

The change pattern 408 is another example of an SR resource configuration or determination. In some embodiments, the SR resource configuration may be associated with a change pattern. The SR resource configuration parameters (e.g. parameters 406) may change according to the change pattern 408. For example, one SR resource may be configured with periodicityAndOffset which indicates periodicity is 4 slots and offset is 1 slot. This configuration with periodicityAndOffset in the SR resource can be changed such that the change pattern relates to that change.

The traffic parameters 410 are another example of an SR resource configuration or determination. In some embodiments, the configuration of SR parameters is associated with a traffic pattern that may include at least one periodicity or packet delay budget ("PDB"). For example, the periodicity of SR resource is same as the periodicity of traffic. The discontinuous reception ("DRX") parameters 412 are another example of an SR resource configuration or determination. For example, one SR resource configuration (or SR group) is used during DRX active time, another SR resource configuration (or SR group) is used outside DRX active time. For another example, the periodicity of SR resource is same as the cycle of DRX. The physical downlink control channel ("PDCCH") skipping duration 414 is another example of an SR resource configuration or determination. For example, one SR resource configuration (or SR group) is used during PDCCH skipping duration and another SR resource configuration (or SR group) is used if PDCCH skipping is not triggered. The search space set 416 is another example of an SR resource configuration or determination. The periodicity of SR resource may not be larger than at least one of a periodicity of traffic, a PDB of a traffic, a DRX onduration timer, a DRX cycle, a PDCCH skipping duration, or a periodicity of a search space set.

The SR resource configuration may be associated with SR-ProhibitTimer, or SR-TransMax. For example, one or more SR-ProhibitTimer, or SR-TransMax may be associated with one SR configuration. Which one is valid is determined according to at least one of predefined information or high layer signaling. In another example, SR resource configuration comprises M SR-ProhibitTimer group (or SR-TransMax) group. Which group is valid is determined according to at least one of predefined information or high layer signaling. In another example, the value of SR-ProhibitTimer, or SR-TransMax may be changed according to at least one of predefined information or high layer signaling.

The SR resource configuration may include a determination with regard to validity. The determination may be to determine SR resource, parameter, CG configuration, CSI-RS resource configuration, CSI report configuration, SRS resource configuration, or SR configuration. The determination may include the elements shown in FIG. 4. In some embodiments, a SR resource configuration is associated with one or more SR group IDs. Which SR resource configuration is valid is determined according to at least one of a high layer signaling or predefined information. The SR resource configuration being valid means that the UE may transmit the SR in the SR resource or using the SR resource configuration. In some embodiments, a SR resource includes one or more set of parameters. Which set of parameters is valid or used may be determined according to at least one of a high layer signaling or predefined information. In some embodiments, a SR resource includes one set of parameters and a change pattern. Whether or not a change is determined in the SR parameter is according to at least one of a high layer signaling or predefined information.

In some embodiments, a SR resource configuration includes a CG configuration. For example, the CG configuration is associated with one or more CG group IDs. The CG configuration that is valid may be determined according to at least one of a high layer signaling or predefined information. The CG configuration being valid means UE can transmit PUSCH according to the CG configuration. In another example, the CG configuration is associated with one or more sets of parameters. The set of parameters that is valid or used may be determined according to at least one of a high layer signaling or predefined information. In another example, a CG configuration includes one set of parameters and a change pattern. When a change is determined in the CG configuration may be according to at least one of a high layer signaling or predefined information.

In some embodiments, a SR resource configuration includes a CSI-RS resource configuration. The CSI-RS resource configuration includes parameters for determining the resource where UE perform CSI measure. For example, the CSI-RS resource configuration is associated with one or more CSI-RS resource group IDs. The CSI-RS resource configuration that is valid is determined according to at least one of a high layer signaling or predefined information. The CSI-RS resource configuration being valid means UE can perform CSI measure according to the CSI-RS resource configuration. In another example, the CSI-RS resource configuration is associated with one or more set of parameters. The set of parameters that is valid or used may be determined according to at least one of a high layer signaling or predefined information. In another example, a CSI-RS resource configuration includes one set of parameters and a change pattern. When a change is determined in the CSI-RS resource configuration is according to at least one of a high layer signaling or predefined information. In some embodiments, the CSI-RS resource group may be associated with zero, one or more CSI-RS resource. In some embodiments, the CSI-RS resource group may be associated with zero, one or more CSI-RS resource set. In some embodiments, the CSI-RS resource group may be associated with zero, one or more CSI-RS resource setting.

In some embodiments, a SR resource configuration includes a CSI report configuration. The CSI report configuration includes parameters to determine a resource where UE can report CSI. For example, the CSI report configuration may be associated with one or more CSI report group IDs. Whether the CSI report configuration is valid is determined according to at least one of a high layer signaling or predefined information. The CSI report configuration being valid means UE can transmit CSI report according to the CSI report configuration. In another example, the CSI report configuration is associated with one or more set of parameters. The set of parameters that is valid or used may be determined according to at least one of a high layer signaling or predefined information. In another example, a CSI report configuration includes one set of parameters and a change pattern. Whether or not a change is determined in the CSI report configuration may be made according to at least one of a high layer signaling or predefined information.

In some embodiments, a SR resource configuration includes a SRS resource configuration. The SRS resource configuration includes parameters to determine a resource where UE can report SRS. For example, the SRS resource configuration may be associated with one or more SRS resource group IDs. The SRS resource configuration that is valid is determined according to at least one of a high layer signaling or predefined information. The SRS resource configuration being valid means UE can transmit SRS according to the SRS resource configuration. In another example, the SRS resource configuration is associated with one or more set of parameters. Which set of parameters is valid or used may be determined according to at least one of a high layer signaling or predefined information. In another example, a SRS resource configuration includes one set of parameters and a change pattern. Whether a change is determined in the SRS resource configuration is according to at least one of a high layer signaling or predefined information. In some embodiments, the SRS resource group may be associated with zero, one or more SRS resource. In some embodiments, the SRS resource group may be associated with zero, one or more SRS resource set. In some embodiments, the SRS resource group may be associated with zero, one or more SRS resource setting.

The predefined information may include a number of different examples in different embodiments. In some embodiments, the predefined information includes at least one of a layer one ("L1") signaling (e.g., downlink control information ("DCI"), a scheduling request ("SR"), or buffer status report ("BSR")), a UE assistance information, a physical uplink control channel ("PUCCH") format, UE capability, a timer, a discontinuous reception ("DRX") active time, DRX onduration timer, DRX inactivity timer, DRX parameter, physical downlink control channel ("PDCCH") monitoring behavior, a predefined value, a predefined condition, predefined pattern, traffic parameter (e.g., periodicity, or packet delay budget ("PDB")), or UL active time (UL transmit pattern). A CG configuration group may be referred to as a CG group. A CSI-RS resource configuration group may be referred to as a CSI-RS resource group. A CSI report configuration group may be referred to as a CSI report group. A SRS resource configuration group may be referred to as a SRS resource group.

In some embodiments, the predefined information includes DCI. The DCI may indicate at least one of a SR group ID, a group ID, a CG configuration group ID, a CSI-RS resource configuration group ID, a CSI report configuration group ID, a SRS resource group ID, a set of parameters, a set of parameter IDs, a trigger flag, an adjust value, or an adjust value index. The group may comprise at least one of a CG group, a CSI-RS resource group, a CSI report group, or a SRS resource group. The DCI may be a first type DCI, which includes at least one of DCI format 0-1, DCI format 1-1, DCI format 0-2, DCI format 1-2, DCI format 0-0, DCI format 1-0, DCI format 2-0, or DCI format 2-6. The field in the DCI may be used to indicate indication information of which SR configuration or SR resource is valid is specific or re-interpreted/modified. A specific field may be a field that is only used to indicate an update (or information) of SR configuration or SR resource. A re-interpreted/modified field may be a field that is used to indicate other information for other situations, but is either re-interpreted or modified to indicate a an update (or information) of SR configuration or SR resource. An indication of an update of SR configuration or SR resource may include an indication of at least one of a SR group ID, a CG configuration group ID, a CSI-RS resource configuration group ID, a CSI report configuration group ID, a SRS resource group ID, a set of parameter, or a change of SR parameter. Whether the field exists may be associated with at least one of a DCI, a Radio Network Temporary Identifier ("RNTI"), a high layer signaling, a UE capability, a frequency range ("FR") type, or a sub-carrier space ("SCS"). The field may exists when a condition is satisfied. Example conditions include:

The DCI is a first type of DCI;

The RNTI is a first type of RNTI, which may include at least one of C-RNTI, CS-RNTI, MCS-C-RNTI, or PS-RNTI;

More than one SR group (or set of parameter or CG configuration group, a CSI-RS resource configuration group, a CSI report configuration group, a SRS resource group) is configured;

A predefined pattern or adjust value is configured;

An enable signaling (e.g., which enable the update (or indicate) of SR configuration or SR resource dynamically) is configured; or A UE capability (e.g., which indicates support for the update (or indicate) of SR configuration or SR resource dynamically) is transmitted/received.

The bitwidth of the field in DCI may be 1 bit or determined by high layer signaling. For example, high layer signaling configures M SR groups. The bitwidth may be determined by operator ($\log_2 M$), the operator may be round up or round down. The trigger flag may be a flag used to indicate one of SR group switching, one or more set of parameter changes, CG configuration group switching, a CSI-RS resource configuration group switching, a CSI report group switching, or a SRS resource group switching. SR configuration parameters includes at least SR-ProhibitTimer, SR-TransMax. The SR-ProhibitTimer may be a timer for SR transmission on PUCCH may include values in milliseconds. When the field is absent, the UE may apply the value 0. The UE cannot transmit SR if the sr-prohibitTimer is running. The SR-TransMax may include a maximum number of SR transmissions. If the SR counter is greater than the SR-TransMax, then the following procedure may be initiated: 1) notify RRC to release PUCCH for all Serving Cells; 2) notify RRC to release SRS for all Serving Cells; 3) clear any configured downlink assignments and uplink grants; 4) clear any physical uplink shared channel ("PUSCH") resources for semi-persistent CSI reporting; and 5) initiate a Random Access procedure on the SpCell and cancel all pending SRs.

In some embodiments, the DCI indicates SR group ID (or set of parameters or a group ID). The DCI may be a non-scheduling DCI. Non-scheduling DCI may include any DCI that does not schedule data. The triggering indication may be indicated in at least one of the following fields: a minimum applicable scheduling offset indication field, a search space set group switch indication field, a secondary Cell ("SCell") dormancy indication field, modulation and coding scheme ("MCS") field, new data indicator field, redundancy version field, hybrid automatic repeat request ("HARQ") process number field, antenna port(s) field, and/or demodulation reference signal ("DMRS") sequence initialization field. These fields may be re-interpreted or modified. In some embodiments, these fields may be re-interpreted or modified if a condition satisfied. The condition may be a field in the DCI indicates the DCI is used for indication of SR resource configuration.

In some embodiments, the DCI may be a group common DCI. A group common DCI is a DCI includes information for one or more UEs. RRC signaling indicates a start point of the SR group ID (or set of parameters or SR resource configuration) indication in the DCI for a UE. RRC signaling further indicates at least one of a location of the indication information carried by the DCI for a UE, a start point of the indication information carried by the DCI for a UE, a length of the information, or a bitmap. Each bit in the bitmap may indicate an indication information for a serving cell group or a BWP group. In one embodiment, one bit in the bitmap indicates an indication information for a serving cell group. In another embodiment, every two or more bits in the bitmap indicates an indication information for a serving cell group. One serving cell group may comprise one or more serving cells. One BWP group may comprise one or more BWPs. For example, the common DCI may be designed as shown in Table 1 below with each block being for one UE, and the UE gets the location of the block for the UE based on a RRC signaling.

TABLE 1

| Common DCI. | | |
|---|---|---|
| Block 1 for UE 1 (e.g., 5 bit) | Block 2 for UE 2 (e.g., 5 bit) | . . . |

Each block may include a bitmap, one or more bits are associated with a serving cell group or a BWP group. The bit indicates the SR group ID or parameter information of the serving cell group or BWP group. Table 2 illustrates an example with one bit in bitmap associate with one BWP group. Indication information may be referred to as indication of SR resource configuration.

TABLE 2

| BWP group association. | | |
|---|---|---|
| Bit 1 Indication information for BWP group 1 | Bit 2 Indication information for BWP group 2 | . . . |

The SR group ID (or set of parameter or SR resource configuration) that is valid may be explicit indicated or may be implicitly indicated by the DCI. An explicit indication may include a field in a DCI that indicates a SR group ID (or a set of parameter or a SR resource configuration). An implicit indication may be the SR group (or a set of parameter or SR resource configuration) indication is bundled (or associated) with an another indication (which may be referred to as a second indication). The second indication may include at least one of PDCCH skipping indication, search space set group switching indication, CG activation indication, CG deactivation indication, SPS activation indication, SPS deactivation indication, SCell dormancy indication, wake up indication, or cross slot scheduling indication.

Figure 5:
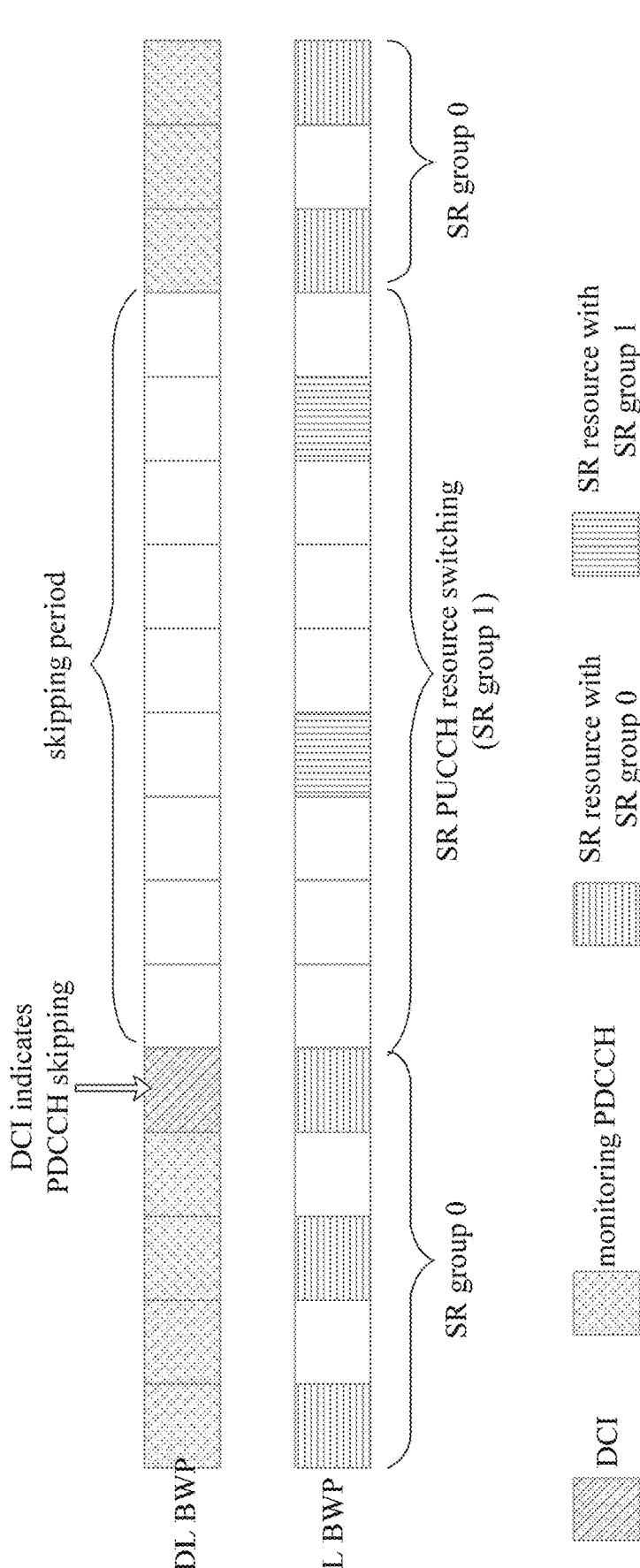
FIG. 5 shows one example for determining a SR group.

FIG. 5 shows one example for determining a SR group. Specifically, FIG. 5 illustrates a determination of a SR group (or a set of parameters or SR resource configuration) according to a DCI or a PDCCH monitoring behavior. In one example, a DCI indicates PDCCH skipping also implicitly indicates SR group ID (or set of parameters or SR resource configuration) change. In some embodiments, the SR group ID used during PDCCH skipping duration may be different from the SR group ID used in the time when PDCCH skipping is not activated. For example, the periodicity of the SR group during the PDCCH skipping period may be larger than the periodicity of the SR group when PDCCH skipping is not activated. In some embodiments, the relationship between the skipping behavior and SR group may be predefined or configured by RRC signaling.

In another example, a DCI indicates a search space set group ID is also implicitly indicates a SR group ID (or set of parameter index or SR resource configuration). For example, DCI indicates search space set group ID 1, which also indicates SR group ID 1 (or set of parameter 1). In some embodiments, the relationship of search space set group and SR group is configured by RRC signaling or predefined information. In another example, a DCI indicates a configured grant ("CG") activation, and implicitly indicates a SR group ID (or set of parameters) is used. A DCI indicates a CG deactivation, and implicitly indicates another SR group ID (or another set of parameters) is used. In some embodiments, the relationship of CG configuration and SR group is configured by RRC signaling or predefined information.

In some embodiments, the predefined information includes at least one of a DRX active time, DRX onduration timer, DRX inacitivity timer, DRX active time, or aDRX parameter. The For example, an SR configuration or SR resource with SR group ID 0 (or set of parameter 0) is valid (or used) during DRX active time. SR configuration or SR resource with SR group ID 1 (or set of parameter 1) is valid outside DRX active time. In another example, an SR configuration or SR resource with one CG group ID (or CSI-RS resource group ID or CSI report group ID or SRS resource group ID) is valid (or used) during DRX active time. SR configuration or SR resource with another CG group ID (or CSI-RS resource group ID or CSI report group ID or SRS resource group ID) is valid outside DRX active time. In some embodiments, the relationship between the DRX parameter and SR group (or set of parameter or CG group or CSI-RS resource group or CSI report group or SRS resource group) may be predefined or configured by RRC signaling. In some embodiments, a periodicity of SR group (or set of parameter or CG group or CSI-RS resource group or CSI report group or SRS resource group) outside DRX active time may be greater than the periodicity of SR group (or set of parameter or CG group or CSI-RS resource group or CSI report group or SRS resource group) during the DRX active time.

The predefined information may include physical downlink control channel ("PDCCH") monitoring behavior. PDCCH monitoring behavior includes PDCCH skipping not being activated. PDCCH skipping may include stopping PDCCH monitoring for a duration, then monitoring PDCCH according to a search space set group. For example, SR group 1 (or set of parameter 1) is valid during PDCCH skipping duration and SR group 0 (or set of parameter 0) is valid after a PDCCH skipping duration when PDCCH skipping is not activated. For another example, one CG group ID (or CSI-RS resource group ID or CSI report group ID or SRS resource group ID) is valid during PDCCH skipping duration and another CG group ID (or CSI-RS resource group ID or CSI report group ID or SRS resource group ID) is valid after a PDCCH skipping duration when PDCCH skipping is not activated. PDCCH monitoring behavior includes monitoring PDCCH according to a search space set group ("SSSG"). In another example, SR group 1 (or set of parameter 1) is valid during a time when UE monitoring PDCCH according to a first type of search space set group. SR group 0 (or set of parameter 0) is valid during the time when UE monitoring PDCCH according to a second search space set group. In some embodiments, the first type of search space set group includes search space set group 1 and group 2 (if configured), and the second type of search space set group include search space set group 0. In another embodiment, the relationship between the PDCCH monitoring behavior and SR group (or set of parameter or CG group or CSI-RS resource group or CSI report group or SRS resource group) is predefined or configured by RRC signaling. In another embodiment, the periodicity of SR group (or set of parameter or CG group or CSI-RS resource group or CSI report group or SRS resource group) when monitoring PDCCH according to one search space set group (SSSG)(e.g., SSSG1 or SSSG2) is greater than the periodicity of SR group (or set of parameter or CG group or CSI-RS resource group or CSI report group or SRS resource group) when monitoring PDCCH according to another SSSG (e.g., SSSG 0).

The predefined information may include a timer. For example, one SR group (or set of parameter) is valid during the timer and another SR group (or another set of parameter) is valid after the timer expires. The timer may be one of a drx onduration timer, a drx inacitivity timer, a PDCCH skipping timer, or a search space set group switching timer.

The predefined information may include at least a UE capability and a PDCCH monitoring behavior. For example, if the UE capability indicates UE support for the update (or dynamic indicate) of SR configuration or SR resource, the SR group (or set of parameter or SR resource configuration) is determined according to the PDCCH monitoring behavior.

The predefined information may include at least a PUCCH format. For example, PUCCH transmitted in a first type of PUCCH format may indicate a first SR resource configuration (e.g., SR group 0) and a PUCCH transmitted in a second type of PUCCH format may indicate a second SR resource configuration (e.g., SR group 1). In another example, RRC may configure more than one set of SR resource configuration. PUCCH transmitted in a first type of PUCCH format may indicate a first SR resource configuration (e.g., SR group 0) from a first SR resource configuration set (e.g., SR group 0 and SR group 1 in the set) and a PUCCH transmitted in a second type of PUCCH format may indicate a second SR resource configuration (e.g., SR group 3) from a first SR resource configuration set (e.g., SR group 3 and SR group 4 in the set). The first or second type of PUCCH format may include at least one of PUCCH format 0, PUCCH format 1, PUCCH format 2, PUCCH format 2, PUCCH format 4. The first type of PUCCH format is different from the second type of PUCCH format.

The predefined information may include at least a UE assistance information. The UE assistance information may indicate a preference for SR configuration or SR resource configuration or SR group or SR parameter. The SR configuration or SR resource configuration or SR group or SR parameter may be determined following the UE assistance information or reference the UE assistance information.

The predefined information may include at least a scheduling request ("SR"). The SR group ID (or set of parameters or SR resource configuration) is indicated in the SR. The indicated SR group (or set of parameters or SR resource configuration) will be used in a following time or a predefined time.

The predefined information may include a buffer status report ("BSR"). The SR group ID (or set of parameters or SR resource configuration) is indicated in the BSR. The indicated SR group (or set of parameters or SR resource configuration) will be used in a following time or a predefined time. In another embodiment, the SR group ID (or set of parameters or SR resource configuration) for the BSR may be indicated in a MAC CE.

The predefined information may include an UL transmit window. For example, one SR group (or set of parameters or SR resource configuration) is used during the UL transmit window and the other is used outside the UL transmit window. In some embodiments, the periodicity of SR resource (or the periodicity of CG configuration, or the periodicity of CSI-RS resource, or the periodicity of CSI report configuration, or the periodicity of SRS resource) used during the UL transmit window may be less than the periodicity of SR resource (or the periodicity of CG configuration, or the periodicity of CSI-RS resource, or the periodicity of CSI report configuration, or the periodicity of SRS resource) used outside the UL transmit window.

As described, a set of parameters include one set of parameter among several sets of parameter, and a new set of parameters may be changed from the original set of parameters. In some embodiments, the original parameter refers to the parameter configured by high layer signaling or the latest used parameter. The change of a parameter or parameters may be referred to as a change parameter or change parameters. Change parameters may include a reference value or an index for finding a new value (changed to the new value) for the parameter. It may include a reference or base point for changing current parameter. One or more parameters may be determined or changed according to at least one of high layer signaling or the predefined information. In some embodiments, the high layer signaling may configure a list of adjust values. Predefined information may include at least a DCI, where a field in the DCI indicates an adjust value from the list of adjust values. The parameter is determined based on the original parameter and the adjust value. For example, P=P_o+P_adjust. P is the the determined parameter (or new parameter), P_o is the original parameter value, P_adjust is adjust value. In some embodiments, the predefined information includes at least a DCI and a field in the DCI indicates a new parameter value and the indicated parameter value can be used. In some embodiments, the predefined information includes a predefined (or predetermined) pattern. The predefined pattern may include at least one of a predefined value, a cycle number, or an adjust value or a timer. For example, the offset of SR resource will add (or subtract) the adjust value every M cycles, where M is the cycle number. In another example, the offset of SR resource will add (or subtract) the adjust value when a timer expires, where the timer will be re-triggerred after change of the offset. In some embodiments, the timer value is determined based on periodicity (or FPS) of a traffic. For example, timer value=M* periodicity of a traffic. M is an integer value greater than 1 and less than 20.

In some embodiments, the predefined information includes PDCCH monitoring behavior. For example, in first type of PDCCH monitoring behavior, the adjust value is one type, while in second type of PDCCH monitoring behavior, the adjust value is a second type. In some embodiments, the first type of PDCCH monitoring behavior includes when PDCCH skipping is not activated, and monitoring PDCCH according to a search space set group 0. In other embodiments, the second type of PDCCH monitoring behavior may include PDCCH skipping which means stopping PDCCH monitoring for a duration, and monitoring PDCCH according to a search space set group 1 or 2. In some embodiments, the periodicity of SSSG 1 or 2 is greater than the periodicity of SSSG 0, or in other embodiments, the SSSG 2 does not associate with a search space set.

The determination of SR resource configuration may be according to a high layer signaling and/or predefined information. If the high layer signaling is configured with more than one SR groups and/or an enable signaling indicating enable, then the SR configuration or SR resource is dynamically updated. In other embodiments, predefined information may indicate an update of SR configuration or SR resource, which results in the update. Otherwise, the SR configuration or SR resource is not updated. If the high layer signaling is configured with a predefined pattern and/or an enable signaling indicating enable of an update to SR configuration or SR resource dynamically, then the SR configuration or SR resource is updated according to the predefined pattern.

SR resource configuration may be determined according to a high layer signaling. High layer signaling may include a MAC CE signaling or RRC signaling. High layer signaling includes at least a predefined pattern. The predefined pattern indicates how to change SR group (or set of parameters). The predefined pattern may be associated with at least a traffic or a Qos ID. Different predefined patterns may associate with different traffic or QoS. The predefined pattern may be indicated by a cycle and a time duration and an offset. One SR group (or set of parameters) may used in the time duration of each cycle, while the other SR group (or set of parameters) is used outside the time duration in each cycle. The predefined pattern may include at least M cycle values. For example, each SR group (or set of parameters) may be associated with one cycle. In a specific cycle, the associated SR group (or set of parameters) may be used. For example, the predefined pattern indicates two cycle values (10, 20), the SR will be transmitted by: 1) the SR group (or set of parameters) switching function is triggered; 2) the SR group 0 is used for the first 10 ms after this function is triggered; 3) after 10 ms, SR group 1 is used for the next 20 ms; and 4) repeating the step 2)-3) before the SR group (or set of parameters) switching function is disabled.

There may be an application delay. Specifically, the determined SR group or parameter may be applied after an application delay. The application delay may be a preparation time for UE and basestation to change SR groups or SR resource configuration. The application delay may be associated with at least one of SCS, a PUSCH preparation procedure time, a N1, a N2, a k0, a k2, a k1, a k0min, a k2min, a minimum scheduling offset, a PDSCH decoding procedure time, a UE capability, a frequency range (FR) type, or a predefined value. The parameters included above may include:

K0min: minimum slot offset between a DCI and its scheduled PDSCH.

K2 min: minimum slot offset between a DCI and its scheduled PUSCH.

K0min or K2 min may referred to minimum scheduling offset.

K1: slot offset between a PDSCH and hybrid automatic repeat request ("HARQ")-Acknowledge ("ACK").

K0: slot offset between a DCI and its scheduled PDSCH.

K2: slot offset between a DCI and its scheduled PUSCH.

N1: PDSCH decoding time.

N2: PUSCH preparation time.

The unit of application delay may be referred to as a symbol or slot or millisecond. In some embodiments, the start of application delay is after the last symbol/slot of a DCI. In some embodiments, the start of application delay is after the last symbol/slot of a timer expires. The unit of application delay may include symbols or slots or frames or millisecond or mini-slots. In some embodiments, the start of application delay is after an update (or indication) of SR resource configuration.

The application delay may be different or same value with different SCS. For example, the application delay associate with a larger SCS will not smaller than the application delay associate with a smaller SCS. In one embodiment, the application delay may be different or same value with different FR type. For example, the application delay associate with FR2 will not smaller than the application delay associate with FR1. In one embodiment, the application delay may equal to or larger than at least one of a N1, a N2, a k0, a k2, a k1, a k0min, a k0min, a PDSCH decoding procedure time, or a PUSCH preparation procedure time. In one embodiment, a UE capability may report a minimum time value supported by a UE. The application delay may not smaller than the value.

An update of the SR configuration or SR resource may be per cell/per logical channel/per bandwidth part (BWP)/per MAC entity/per UE/per FR type/per SCS/per cell group/or per logical channel group. In other words, the updates may be individual on any of those entities.

The switching or changing may be enabled, triggered, used, or activated. The terms enable, trigger, use, and activate may be used interchangeably. The SR group switching or change set of parameters is enabled if a condition satisfied. The condition may be associated with at least one of a RRC signaling, a MAC CE signaling, a L1 signaling, DRX active time, PDCCH monitoring behavior, UE capability, or a DRX configuration. The condition can be satisfied when:

A RRC signaling includes a SR group or more than one set of SR parameters or at least one of adjust value or a CG group is configured;

A RRC signaling indicates enable SR group switching or a change set of SR parameters or dynamic change of SR resource configuration is configured;

A UE capability indicates UE support SR group switching or a change set of SR parameters or dynamic change of SR resource configuration;

A L1 signaling (e.g., DCI) indicates activating a SR group switching or change set of SR parameters or dynamic change of SR resource configuration; or A MAC CE signaling indicates activating a SR group switching or change set of SR parameters or dynamic change of SR resource configuration.

In some embodiments, a high layer signaling may include a different enable information. The different enable information may be used to control SR triggering when a configured uplink grant of type1 or type2 is configured. The enable information may be configured per UE or per BWP. If a regular BSR was triggered and the enable information is configured as enable, UE can trigger a SR. If the MAC entity is configured with configured uplink grant(s) and the regular BSR was triggered for a logical channel for which logical-ChannelSR-Mask is set to false, and if a Regular BSR has been triggered and logicalChannelSR-DelayTimer is not running, then UE can trigger a SR.

In some embodiments, a number of scheduling request ("SRs") can be transmitted during a first type of time duration that is not greater than M, where M is an integer greater than or equal to 0 and less than 10. The first type of time duration may be associated with at least one of a DRX active time, DRX parameter, PDCCH skipping duration, or SSSG. The first type of time duration may include at least one of a time duration outside DRX active time, a time duration after drx-inactivity timer expired, during PDCCH skipping duration, or during SSSG 1 or 2.

SR resource configuration may be associated with a configured grant ("CG"). Predefined information may include at least a CG configuration and a predefined condition. The SR configuration may be updated according to at least a RRC signaling and a CG configuration. In some embodiments, a SR configuration or a SR resource is related to (or associated with) a CG configuration. In some embodiments, a SR configuration or SR resource is available if a predefined condition is satisfied, otherwise the SR configuration is not available. A SR configuration is available which means the UE can transmit a SR according to the SR configuration and the related SR resource. The predefined condition is satisfied when: 1) the related CG is a Type 1 and the first PUSCH of the CG has been transmitted; 2) a related CG is activated; and/or 3) an activation DCI which activate a CG or SR is received.

FIG. 6 shows one example of configuration with a schedule request ("SR") transmit occasion. In some embodiments, the SR resource for the SR configuration is configured to be associated with a CG configuration. The periodicity (P_SR) of the SR resource is associated with a CG configuration. For example, the P_SR is less than or equal to the periodicity (P_CG) of CG configuration. For example, P_SR=M*P_CG, where M is greater than 0 and less than or equal to 1. The offset of SR resource is associated with a CG configuration. For example, the offset may be a duration between the last symbol (or slot) of a CG-PUSCH and the first symbol (or slot) of a SR transmission occasion. In another example, the offset is a duration between a CG-PUSCH and a SR transmission occasion.

In some embodiments, the SR resource for the SR configuration is changed (or modified) according to a CG configuration if the second condition is satisfied (or the SR configuration is available). In some embodiments, the SR resource for the SR configuration is a fallback to (or changed to) the original configuration if the second condition is not satisfied. The periodicity (P_SR) of the SR resource may be changed to a value less than or equal to the periodicity (P_CG) of CG configuration if the second condition is satisfied. For example, P_SR=M*P_CG, where M is greater than 0 and less than or equal to 1. The offset of SR resource is changed to an offset which indicates a duration between the last symbol (or slot) of a CG-PUSCH and the first symbol (or slot) of a SR transmission occasion. In another example, the offset is changed to a duration between a CG-PUSCH and a SR transmission occasion. The offset (O_SR) of SR resource is changed to a value associate with the offset (O_CG) and periodicity (P_CG) of a CG configuration. For example, O_SR=O_CG+P_CG/2. The second predefined condition is satisfied when: 1) the related CG is a Type 1 and the first PUSCH of the CG has been transmitted; 2) a related CG is activated; and/or 3) an activation DCI which activate a CG or SR is received.

FIG. 7 shows another example of configuration with a schedule request ("SR") transmit occasion. Specifically, the periodicity and offset of SR is changed if a type 2 CG configuration is activated by an activation DCI.

In some embodiments, the offset of SR resource is indicated by an activation DCI. Activation DCI may be a DCI which activates a CG configuration. In one example, the offset of SR is indicated in a field of the activation DCI. The field may indicate a number of slots between the DCI and first SR transmit occasion. The field is at least one of a specific field for the SR, or a reinterpretation/modification of an existing field. In another example, the offset of SR is implicitly indicated by the activation DCI. For example, the offset (O_SR) of SR may be derived by the offset (O_CG) of CG which is indicated by the DCI. For example, O_SR=O_CG+A, where A is greater than zero and less than 20.

The system and process described above may be encoded in a signal bearing medium, a computer readable medium such as a memory, programmed within a device such as one or more integrated circuits, one or more processors or processed by a controller or a computer. That data may be analyzed in a computer system and used to generate a spectrum. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method performed by user equipment ("UE") in a wireless network, the method comprising:
   receiving from a basestation in the wireless network, a signal including a scheduling request ("SR") resource configuration, wherein the SR resource configuration is associated with a configured grant ("CG") configuration; and
   determining a validity of the SR resource configuration based on predefined condition, wherein the predefined condition is satisfied when a CG related to the SR resource configuration is activated and an activation downlink control information ("DCI") which activates a SR is received.

2. The method of claim 1, further comprising:
   transmitting one or more SRs based on the validity determination of the SR resource configuration.

3. The method of claim 2, wherein a number of the transmitted SRs during a first type of duration does not exceed a threshold value.

4. The method of claim 1, wherein the SR resource configuration is associated with at least one of a discontinuous reception ("DRX") parameter, a traffic parameter, a time division duplex ("TDD") pattern, a configured grant ("CG") configuration, a physical downlink control channel ("PDCCH") skipping duration, a search space set configuration, a UE capability, UE assistance information, SR group identification, a group identification, a CSI-RS resource parameter, a CSI report parameter, a SRS resource parameter, a change pattern, a SR parameter, SR-ProhibitTimer, or SR-TransMax.

5. The method of claim 4, wherein the SR resource configuration is associated with one or more SR group identification ("ID") and the SR group ID indicates which SR group the SR resource configuration belongs to, further wherein multiple SR resource configurations are associated with a SR group ID or a SR group ID is associated with no SR resource configurations.

6. The method of claim 4, wherein the SR resource configuration is associated with one or more set of SR parameters that comprise at least one of a periodicity or an offset, or one or more set of CSI-RS resource parameters, or one or more set of SRS resource parameters, or one or more set of CSI report parameters, or one or more set of CG configuration.

7. The method of claim 4, wherein the SR resource configuration is associated with a change pattern, wherein the change pattern includes a timer and an adjustment value, wherein a parameter in the SR resource configuration is changed according to the adjustment value if the timer expire and the timer will be re-triggered when the parameter in the SR resource configuration is changed.

8. The method of claim 1, wherein the predefined information comprises at least one of a layer one ("L1") signaling, a UE assistance information, a UE capability, a physical uplink control channel ("PUCCH") format, a timer, a discontinuous reception ("DRX") parameter, a DRX active time, a DRX duration timer, a DRX inactivity timer, a physical downlink control channel ("PDCCH") monitoring behavior, a predetermined value, a predetermined condition, a predetermined pattern, a traffic parameter, a schedule request ("SR"), a buffer status report ("BSR"), or a UL transmit pattern.

9. The method of claim 8, wherein the predefined information comprises a UL transmit pattern which includes an UL transmit window, wherein a first SR group is used during the UL transmit window and a second SR group is used outside the UL transmit window.

10. The method of claim 1, wherein the predefined information comprises downlink control information ("DCI").

11. The method of claim 10, wherein the DCI indicates an indication information at least one of a SR group identification ("ID"), a group identification, a trigger flag, a parameter set change indication, a SR configuration parameter change indication, a SR-ProhibitTimer change indication, a SR-TransMax change indication, an adjustment value, or an adjustment value index.

12. The method of claim 11, wherein the indication is in a field and an existence of the field is associated with at least one of a downlink control information ("DCI"), a Radio Network Temporary Identifier ("RNTI"), a high layer signaling, a UE capability, a frequency range ("FR") type, or a sub-carrier space ("SCS").

13. The method of claim 11, wherein a radio resource control ("RRC") signaling indicates at least one of a location of indication information carried by the DCI for the UE, a start point of the indication information, or a bitmap, wherein each one or more bit in the bitmap indicates the indication information for a serving cell group.

14. The method of claim 11, wherein the indication is associated with at least one of a physical downlink control channel ("PDCCH") skipping indication, a search space set group ("SSSG") switching indication, a configured grant ("CG") activation indication, a CG deactivation indication, a semi-persistent scheduling ("SPS") activation indication, a SPS deactivation indication, a secondary cell ("SCell") dormancy indication, or a cross slot scheduling indication.

15. The method of claim 1, wherein the SR resource is valid after an application delay, wherein the application delay is associated with at least one of a sub-carrier space ("SCS"), a physical uplink shared channel ("PUSCH") preparation procedure time, a minimum scheduling offset, an application delay for cross slot scheduling, an application delay for SSSG switching, and application delay for PDCCH skipping, a physical downlink shared channel ("PDSCH") decoding procedure time, a UE capability, or a predetermined value.

16. The method of claim 1, wherein the determining the validity is in response to an enable condition, wherein the enable condition is associated with at least one of a radio resource control ("RRC") signaling, a medium access control control element ("MAC CE") signaling, a layer one ("L1") signaling, a discontinuous reception ("DRX") active time, physical downlink control channel ("PDCCH") monitoring behavior, a UE capability, or DRX configuration.

17. The method of claim 1, further comprising:
receiving a high layer signaling including a second enable information which is used to control SR triggering when a configured uplink grant of type1 or type2 is configured, wherein the second enable information is configured per UE or per bandwidth part ("BWP").

18. A method performed by a base station in a wireless network, the method comprising:
transmitting, to a user equipment ("UE"), a signal including a scheduling request ("SR") resource configuration, wherein the SR resource configuration is associated with a configured grant ("CG") configuration; and
determining a validity of the SR resource configuration based on predefined condition, wherein the predefined condition is satisfied when a CG related to the SR resource configuration is activated and an activation downlink control information ("DCI") which activates a SR is received.

19. A wireless communications apparatus comprising:
a memory operable to store computer-readable instructions; and
a processor circuitry operable to read the computer-readable instructions, the processor circuitry when executing the computer-readable instructions is configured to:
receive from a basestation in a wireless network, a signal including a scheduling request ("SR") resource configuration, wherein the SR resource configuration is associated with a configured grant ("CG") configuration; and
determine a validity of the SR resource configuration based on predefined condition, wherein the predefined condition is satisfied when a CG related to the SR resource configuration is activated and an activation downlink control information ("DCI") which activates a SR is received.

* * * * *